United States Patent
Kazakevich et al.

(10) Patent No.: US 6,714,769 B2
(45) Date of Patent: Mar. 30, 2004

(54) METHOD AND SYSTEM FOR IMPLEMENTING SMART ANTENNAS AND DIVERSITY TECHNIQUES

(75) Inventors: Leonid Kazakevich, Plainview, NY (US); Gerard Klahn, Sayville, NY (US); Fatih Ozluturk, Port Washington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 10/328,663

(22) Filed: Dec. 23, 2002

(65) Prior Publication Data

US 2003/0171099 A1 Sep. 11, 2003

Related U.S. Application Data

(60) Provisional application No. 60/363,051, filed on Mar. 8, 2002.

(51) Int. Cl.$^7$ ............................. H03C 7/02; H04B 1/02; H04B 7/02
(52) U.S. Cl. ................... 455/101; 455/67.11; 455/63.1; 455/522; 455/510; 370/252; 370/339; 370/437; 375/347; 375/349
(58) Field of Search ................................. 455/101, 67.7, 455/67.1, 63, 523, 522, 516, 512, 510, 13.3, 67.11, 67.13, 63.1, 63.2, 63.4, 501; 370/252, 339, 437, 442, 345; 375/347, 349

(56) References Cited

U.S. PATENT DOCUMENTS

| | | | |
|---|---|---|---|
| 6,434,375 B1 | * | 8/2002 | Chulajata et al. ........ 455/276.1 |
| 2003/0016637 A1 | * | 1/2003 | Khayrallah et al. ......... 370/329 |
| 2003/0027540 A1 | * | 2/2003 | Da Torre ................. 455/277.1 |
| 2003/0031236 A1 | * | 2/2003 | Dahlman et al. ........... 375/147 |
| 2003/0043887 A1 | * | 3/2003 | Hudson ...................... 375/144 |
| 2003/0067895 A1 | * | 4/2003 | Paneth et al. ............... 370/330 |

* cited by examiner

Primary Examiner—Nay Maung
Assistant Examiner—Edan Orgad
(74) Attorney, Agent, or Firm—Volpe and Koenig, P.C.

(57) ABSTRACT

Method and apparatus for transfer of signals from multiple antennas down to baseband over a common radio frequency (RF) chain. Antenna selection having greater flexibility and applicability to both uplink and downlink wherein priority is given to the antenna receiving a better quality signal. Measurements are taken during each time slot to determine the weighting to be given to the antenna with the better quality signal. Techniques and apparatus are provided to take measurements over a range of intervals from time slots to single symbols, for example, to select the best signal the techniques described herein may be used individual, and in some cases are combined to receive additional benefits in efficiency.

32 Claims, 4 Drawing Sheets

METHOD AND SYSTEM FOR IMPLEMENTING SMART ANTENNAS AND DIVERSITY TECHNIQUES

CROSS REFERENCE TO RELATED APPLICATIONS

This application claims priority from U.S. provisional application No. 60/363,051 filed on Mar. 8, 2002, which is incorporated by reference as if fully set forth.

FIELD OF THE INVENTION

The present invention relates to wireless technology. More particularly, the present invention relates to the field of smart antennas and diversity techniques for improving the quality of the transmitted and/or received communication to facilitate selection of the better quality signal.

BACKGROUND

Transmitters and receivers of wireless systems typically employ a single antenna which may be preferred from a cost viewpoint. However, multiple antenna arrays have also been employed which have been found to provide certain cost/benefit features. It is nevertheless highly desirable to provide a capability of selecting the antenna receiving (or in the alternative transmitting) the signal having the best quality.

SUMMARY

The present invention, in one embodiment, is characterized by providing techniques and apparatus for monitoring signals received by each antenna in a multi-antenna array to determine signal quality, and to select the better quality signal for processing. Monitoring of signal quality continues throughout the reception period in order to provide the capability of altering the selection of the signal chosen for processing whenever such a change is again warranted. Some of the techniques described herein are usable for both uplink and downlink applications.

BRIEF DESCRIPTION OF THE FIGURES

The following figures are useful in describing the techniques and apparatus embodying the principles of the present invention in which like elements are designated by like numerals and, wherein.

DETAILED DESCRIPTION AND PREFERRED EMBODIMENTS THEREOF

Figure 1:
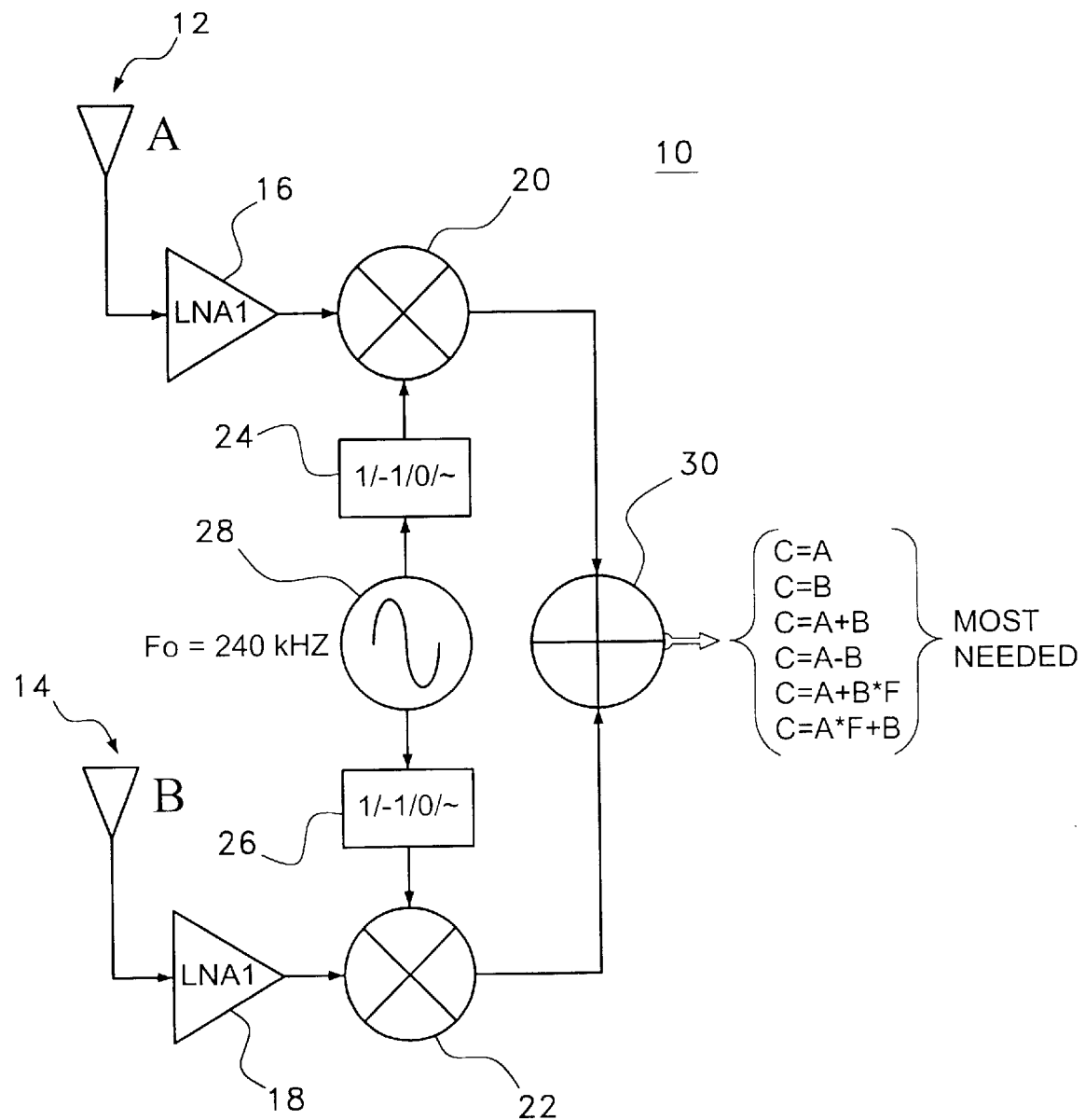
FIG. 1 is a simplified schematic showing one preferred embodiment of a multiple antenna system embodying the principles of the present invention.

FIG. 1 shows a receiver facility 10 comprised of antennas 12 and 14, each receiving an incoming RF signal from a remote transmitter, not shown. The signals received by antennas 12 and 14 are respectively amplified at 16 and 18 by linear low noise amplifiers and are then respectively delivered to mixers 20 and 22 where they are multiplied by low frequency components, which could be 0, 1, −1, or a continuous wave source with a period equal to a symbol (e.g. 240 kHz for WTDD)

In the example shown in FIG. 1, the symbol rate for a code division multiple access (CDMA) based system is 240 kHz and, after despreading the signals derived from the multiple antennas they can be separated. It should be noted that other frequencies which can achieve the same effect may be selected.

Circuits 24 and 26 respectively provide the support signals for the incoming signals and are driven by source 28 which in the example given, operates at 240 kHz. The signals from mixers 20, 22 are combined at 30 to provide the possible outputs as shown. The outputs are then sent to a single receiver for further processing.

It should be noted that the antennas employed may be similar to one another and placed at different locations or may be of different designs. The resulting signals are compared to determine their quality and selected to obtain the best quality signal. Also, more than two antennas may be employed.

Figure 2:
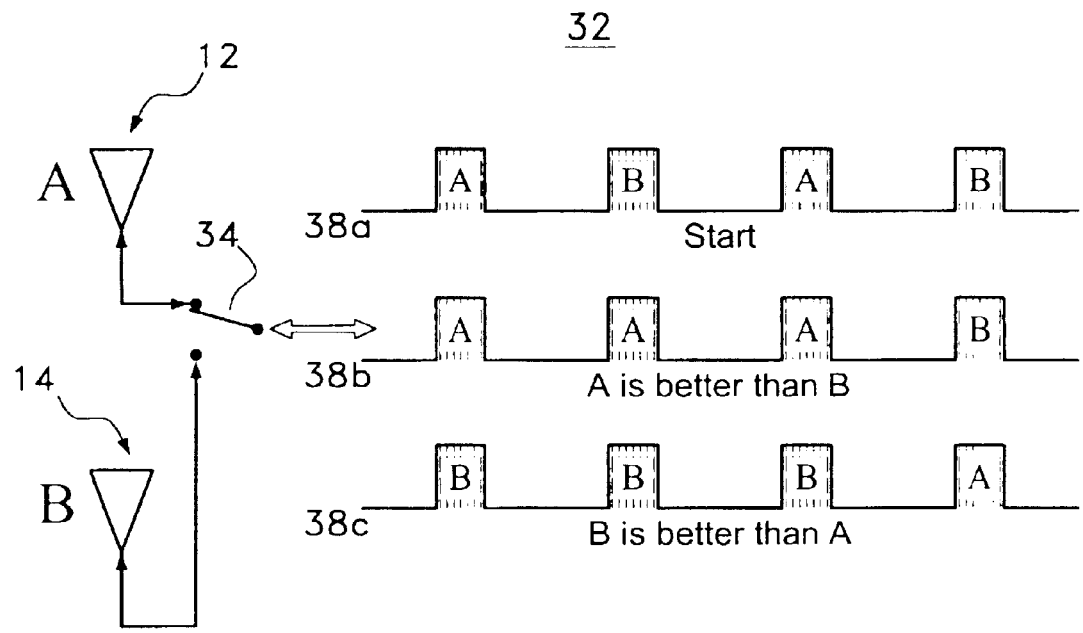
FIGS. 2 through 5 are simplified diagrams showing further alternative embodiments of the present invention.

FIG. 2 shows another alternative embodiment 32 of the present invention in which antennas A and B, which may be used either for uplink or downlink applications, are coupled through switch means 34 which may preferably be electronic switching means for coupling to the selected antenna for transmission purposes, or for coupling the selected antenna to an input of a receiver for reception purposes. In a downlink example, the receiver processes a sequence of timeslots or a sequence of frames from one antenna and another number of units from the remaining antenna(s). Although only two antennas are shown in FIG. 2, it should be understood that a greater number of antennas may be employed.

Figure 3:
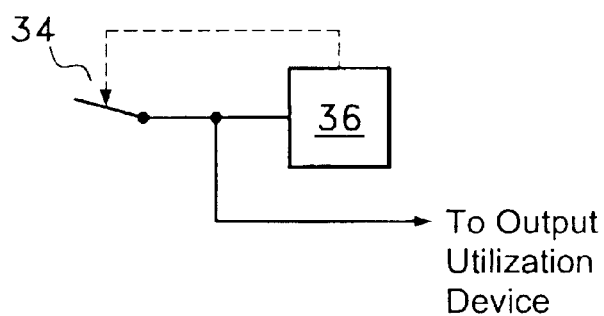

As an initial operation, the output signal is coupled to monitoring device 36, shown in FIG. 3. Assuming that the quality of the signals A and B are substantially equal, monitoring circuit 36 operates switching means 34 to alternate so that the frames or slots received are alternately transferred to the output utilization device as shown by waveform 38a. As another example, the alternating switching arrangement may be two (or more) consecutive time slots of signal A alternating with an equal number of time slots of signal B.

Assuming that the frame or slot of each of the signals A and B being examined indicate that the quality of the signal A is superior to that of the signal B, as a result, the monitoring means 36 operates switch means 34 in such a manner as to receive three units (i.e. time slots, frames, etc.) of signal A in succession and thereafter switch to antenna 14 to receive one unit of signal B, and thereafter repeating this pattern. Throughout this signal selection, the monitoring circuit 36 continues to monitor the slots/frames of each signal A and B and, in the event that there is a change in signal quality, whereupon the quality of signal B is superior to that of signal A, monitoring means 36 operates switch means 34 so as to couple a greater number of consecutive units of signal B to the output utilization device and thereafter a lesser number of consecutive units of signal A, repeating this pattern until another change in signal quality occurs between the signals A and B. Again, it should be noted that monitoring of signals A and B continues throughout the reception period (or transmission) to continually ascertain the quality of the signals A and B and to alter the weighting of the intervals per antenna coupled to the receiver.

Although the example given shows a 3-to-1 ratio of signal reception intervals favoring signal A as shown by waveform 38b or favoring signal B, shown by waveform 38c, it should be understood that other weightings may be selected and such weightings may be selected as a function of relative quality. For example, one relative quality level may warrant a 4-to-1 ratio, a lower relative quality level may warrant a 3-to-1 ratio, a still lower quality level may warrant a 2-to-1 ratio, and so forth. The antennas 12 and 14 employed may be similar in design and distinguished merely by physical location; or may be antennas of different designs. For example, both antennas may be omni-directional, one antenna may be omni-directional and the other have a highly directional radiation pattern, and so forth. Each antenna may alternatively be an antenna array, the arrays having different directivity patterns, similar directivity patterns but with dissimilar orientations, and so forth.

The number of antennas switched may be greater in number than two. However, monitoring and comparison of the A and B signals and another signal or signals continues regardless of the priority given, whereupon a change in signal quality as between the signals monitored will cause an appropriate change in the priority. It should be noted that when signal quality as between the monitored signals is equal, an alternating pattern as shown by waveform 38a is obtained. Equality may be provided employing other patterns as well. For example, two intervals or frames of signal A may alternate with two intervals or frames of signal B.

The arrangement of the embodiment shown in FIGS. 2 and 3 is simple to implement and cost of implementation is minimal.

Figure 4:
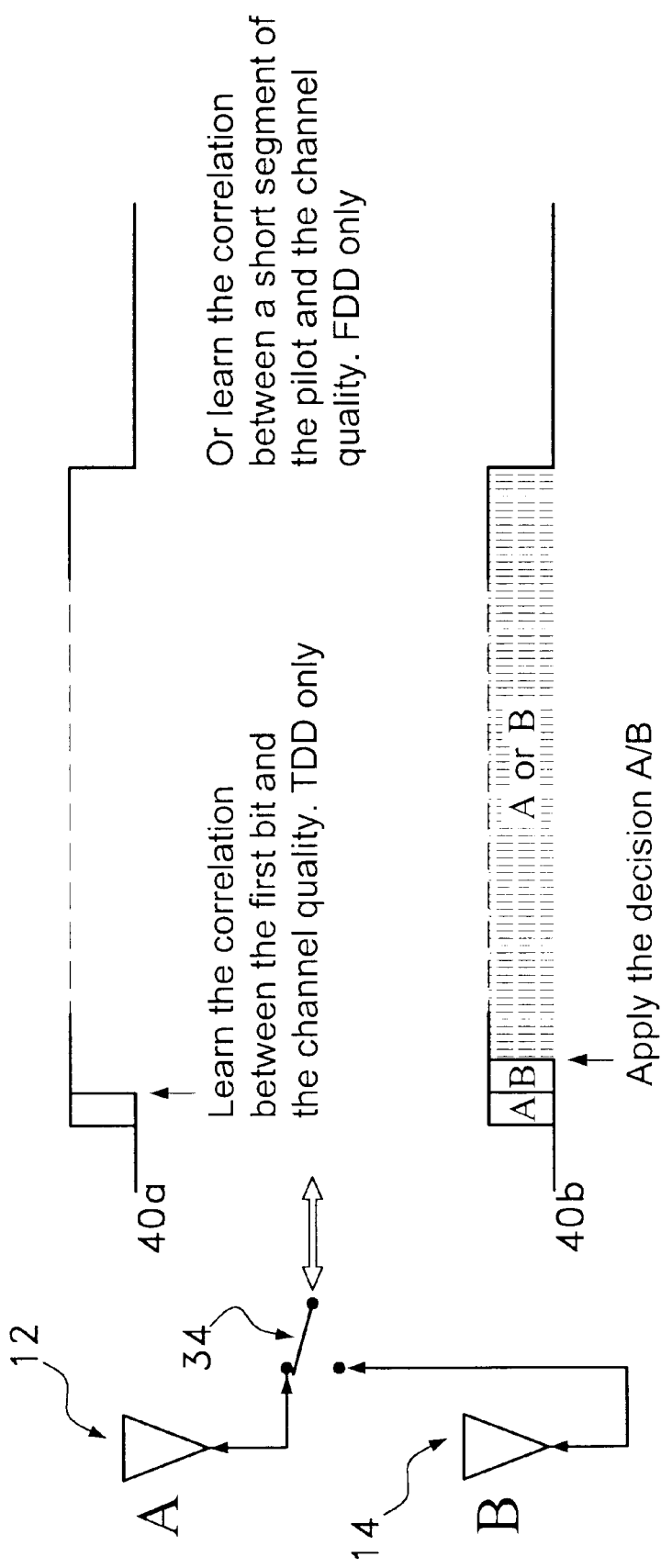

The same technique may be used for uplink application, especially for time division duplex (TDD) systems. Since uplink and downlink channels are reciprocal in TDD, once signal quality is measured at each antenna, this information is utilized to decide which antenna is given priority and in a similar fashion to that of the reception application, a transmitter transmits multiple units from one antenna and another different number of units from the other antenna based on comparison of their signal qualities. The transmitter facility may provide a pilot signal to remote receivers, over each antenna FIG. 4 shows another alternative embodiment of the present invention and a modification of that shown in FIG. 2. In the embodiment 32 of FIG. 2, measurements are made over the whole time slot, and a decision based on these measurements is utilized in the next subsequent time slot or frame. To significantly reduce the delay in initiating priority of the compared signals, the embodiment 32' shown in FIG. 3 performs measurements at the beginning of a time slot or frame by examining only one or a few symbols. To accomplish this, the receiver learns the correlation between measured quality in a first bit or symbol or several bits or symbols and the rest of the time slot or frame. This is accomplished, for example, by calculating and storing in a memory the energy per symbol of the first symbol(s) to compare this with the energy per symbol of the remainder of the time slot, and the block error of the time slot and building a correlation model, which will be used for the real time measurements. The technique of FIG. 4 is preferable to the technique shown in FIG. 2 when faster changing channels are encountered.

In TDD applications, the correlation between the first bit(s) energy and channel quality is determined, shown by waveform 40a. (In case of frequency division duplex applications, the monitoring device learns the correlation between a short segment of the pilot energy or other parameters and the channel quality). As shown by waveform 40b, one or two symbols of signal A are analyzed followed by an analysis of one or two symbols of signal B and, immediately thereafter, the remainder of the time slot or frame is derived from the selected antenna 12 or 14 in accordance with the quality levels of the signals A and B.

The first one or two signals utilized for quality measurements and comparisons may be reconstructed through the utilization of error correcting codes or the like.

Figure 5:
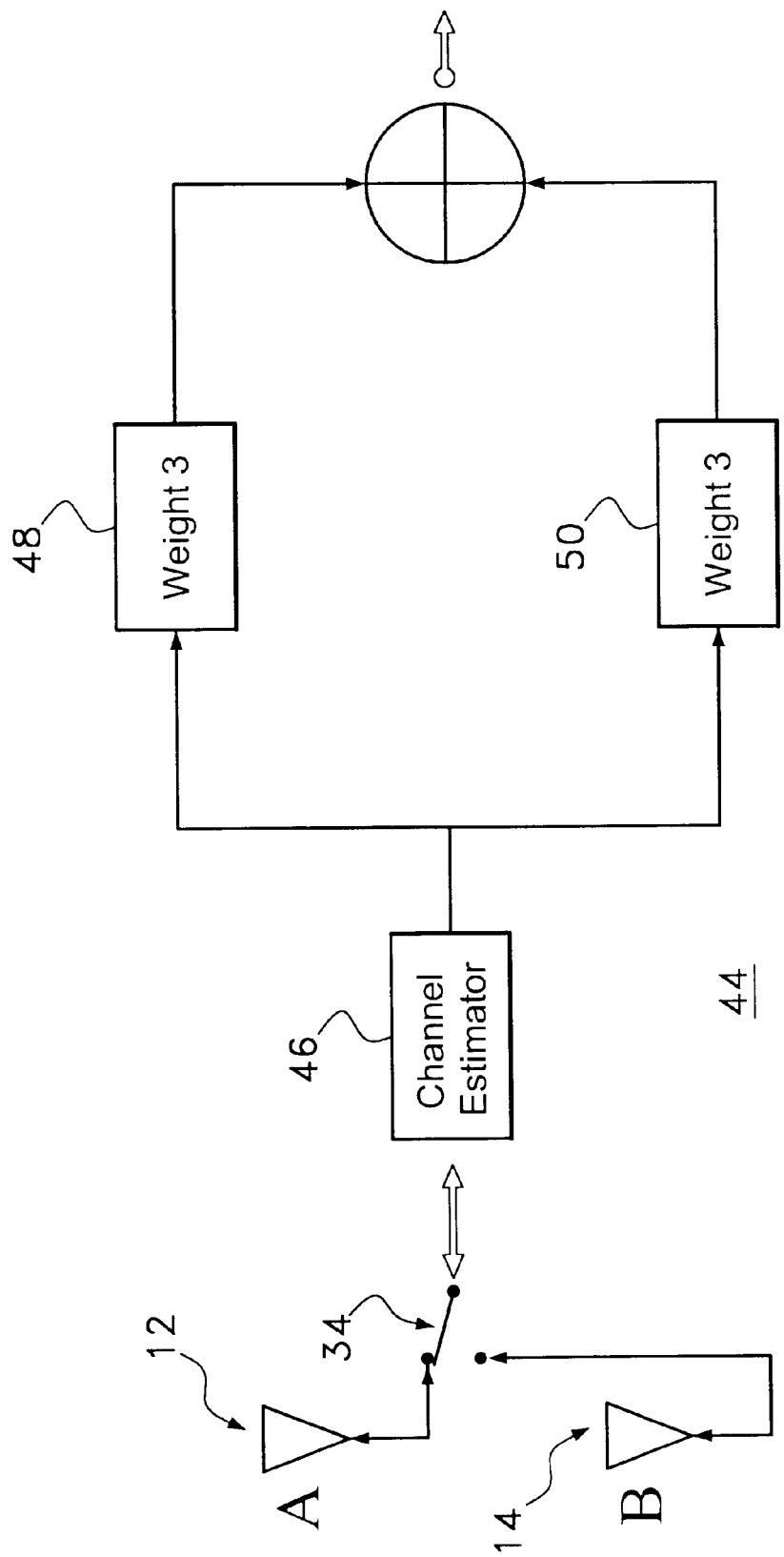

FIG. 5 shows still another embodiment of the present invention in which techniques of the previous embodiments are combined to reap the benefits of each technique as channel conditions warrant. Although the technique necessitates a greater amount of processing, more optimal solutions are available.

In the embodiment 44 shown in FIG. 5, channel estimator 46 estimates channel response and changes the weights of the algorithms of 48 and 50 (block 48 deploys the algorithm 32 and block 50 uses algorithm 32') depending upon the channel properties (e.g. for fast changing channels 32' will be used more often, for slow changing channels 32 will be used more often).

In still another embodiment of the present invention, in third generation (3G) systems of the TDD and FDD types, there is a need for single quality measurements in order to make decisions regarding various processes. In the present invention, one example is a selection of a signal from one of the antennas to process for receive and transmit diversity. The desired measurement is typically related to signal-to-noise ratio which may be inferred from signal measurements. The present concept provides the ability to make decisions based on noise level when nothing else is known about the signal. As one example, broadband signal level is measured from the multiple antennas to decide among the antennas, such as antennas 12, 14 of FIG. 1, which one has the stronger signal. In the event that there is no way to know if the signal measured is due to desired signal or interference, the noise energy in a guard period is measured and then the energy per bit is measured for each antenna in order to select the antenna with the highest energy per bit to the noise energy ratio in order to select the antenna with the highest signal to noise ratio. Thus, the guard period (no signal) received by each antenna A and B is alternately measured in order to give priority to the desired signal. As another alternative, measurements may be performed during the intervals between the transmission of data signals, and analyzing in order to determine which signal to give priority. The priority may then be weighted in the matter described here and above such as the example shown in FIG. 2.

What is claimed is:

1. A method for handling a communication comprised of sequentially transmitted slots of equal length received by at least two antenna assemblies for connection to a device for processing, comprising:

a) transferring outputs of said antenna assemblies to said device in an alternating fashion so that successive slots are transferred to said device from a different one of said antenna assemblies;

b) monitoring each received slot for signal quality; and c) modifying the transferring sequence so that at least two consecutive slots are transferred to said device from that one of the antenna assemblies providing slots of better signal quality for every single slot of lesser signal quality transferred to said device by the remaining one of the antenna assemblies.

2. The method of claim 1 further comprising continuing monitoring of at least one slot from each antenna for signal quality to detect changes in signal quality.

3. The method of claim 2 further comprising reverting back to the transfer pattern of step (a) when the signal qualities of slots from said antenna assemblies are substantially equal.

4. The method of claim 1 wherein step (c) further includes increasing a number of sequential slots transferred from the antenna assembly having better signal quality for every single slot transferred from the remaining antenna assembly outputting a signal of lesser quality when a difference in signal quality between the better quality signal and the lesser quality signal is increasing.

5. The method of claim 1 wherein the signal received by the antenna assemblies is modulated for transmission and said device is a receiver which demodulates the received slots.

6. The method of claim 1 wherein step (b) further comprises:
(d) measuring noise energy in a guard period of a time slot.

7. The method of claim 6 wherein step (d) further comprises employing the measured noise energy for determining a signal-to-noise ratio.

8. The method of claim 1 wherein step (b) further comprises:
(d) measuring, for each antenna, noise energy in a guard period of a time slot;
(e) measuring for each antenna, energy per bit; and
(f) selecting that antenna having the highest energy per bit to the noise energy ratio.

9. The method of claim 1 wherein step (b) determines correlation between a time slot symbol and a reminder of a time slot.

10. The method of claim 1 wherein step (b) determines correlation between a time slot symbol and a block error of the symbol.

11. The method of claim 9 wherein the correlation is determined by storing energy and block error of the time slot.

12. The method of claim 1 wherein step (b) comprises:
(d) determining a correlation between measured quality in one of a first bit and symbol and a remainder of one of a time slot or frame.

13. The method of claim 12 wherein step (d) includes:
computing energy per symbol of at least a first symbol and comparing the computed energy with an energy per symbol of a remainder of the time slot.

14. A method for processing a communication comprised of sequentially transmitted slots of equal length received by first and second antenna assemblies comprising:
multiplying slots respectively outputted from said first and second antenna assemblies with a signal F having a given frequency f and summing the converted signals to provide outputs A, B, A+B, A−B; A+B*F and A*F+B, where slots A are derived from said first antenna assembly and slots B are derived from said second antenna assembly.

15. The method of claim 14 further comprising monitoring the slots A and B for signal quality and passing only that one of the slots A and B having better signal quality.

16. The method of claim 15 further comprising reversing the selection of the slots when signal quality of the slots A and B is reversed.

17. The method of claim 14 further comprising selecting a frequency f of signal F which is chosen so that when the slots A and B are multiplied by the signal F, they are orthogonal.

18. The method of claim 17 wherein the frequency selected is 240 kHz.

19. Apparatus for enhancing signal quality of a communication delivered to a device, said signal having sequentially transmitted slots, comprising first and second antenna assemblies for receiving said communication;
a switching unit for switching an output of each antenna assembly to said device in an alternating fashion so that sequential slots are switched to said device by a different one of the antenna assemblies;
means for monitoring outputs of the antenna assemblies for signal quality; and;
said switch means including means responsive to said monitoring means for modifying the switching sequence to cause at least two slots to be coupled to said device from that antenna assembly having a better signal quality before a slot is transferred from that antenna assembly have a poorer signal quality.

20. The apparatus of claim 19 wherein said means for modifying returns the switching pattern to sequential slots being coupled to said device by different antenna assemblies when the signal qualities of outputs of the first and second antenna assemblies are substantially equal.

21. The apparatus of claim 19 wherein said device is a receiver having means for processing the slots transferred thereto to obtain baseband signals.

22. The apparatus of claim 19 wherein said monitoring means evaluates substantially an entire slot for determining signal quality.

23. The apparatus of claim 19 wherein monitoring means evaluates only a few initial symbol(s) of a slot for determining signal quality.

24. The apparatus of claim 23 wherein only one symbol of a slot is evaluated.

25. The apparatus of claim 23 wherein only a first few symbols of a slot are evaluated.

26. The apparatus of claim 23 wherein a signal communicated to said antenna assemblies includes error correction encoding and said apparatus further comprises:
means for restoring information lost from the symbols employed to determine signal quality.

27. The apparatus of claim 23 wherein the evaluation of the monitoring means includes means correlating the initial symbol(s) and a reminder of the time slot.

28. The apparatus of claim 27 wherein the correlating means stores energy of a slot(s) and a block error of the time slot to determine correlation.

29. The apparatus of claim 23 further comprising means for evaluating signal quality at a beginning of a time slot and processing a remainder of the received time slot based on said evaluation.

30. The apparatus of claim 29 wherein said means for making a signal quality evaluation includes means for determining a correlation between a quality value of the first bit and the remaining time slot.

31. The apparatus of claim 29 wherein said communication signal is a time division duplex (TDD) type and said means for making a signal quality evaluation includes means for determining a correlation between a first bit and channel quality.

32. The apparatus of claim 29 wherein said communication signal is a frequency division duplex (FDD) type and said means for making a signal quality evaluation includes means for determining a correlation between a short segment of a received pilot signal and channel quality.

* * * * *

UNITED STATES PATENT AND TRADEMARK OFFICE
CERTIFICATE OF CORRECTION

PATENT NO. : 6,714,769 B2
DATED : March 30, 2004
INVENTOR(S) : Kazakevich et al.

It is certified that error appears in the above-identified patent and that said Letters Patent is hereby corrected as shown below:

<u>Title page,</u>
Item [57], ABSTRACT,
Line 11, after the word "used", delete "individual" and insert therefor -- individually --.

<u>Column 3,</u>
Line 36, after the word "embodiment", delete "32" and insert therefor -- 32 --.
Line 40, after the word "embodiment", delete "32" and insert therefor -- 32' --.

<u>Column 4,</u>
Line 7, after the word "embodiment", delete "44" and insert therefor -- 44 --.

<u>Column 5,</u>
Line 25, after the phrase "symbol and a", delete "reminder" and insert therefor -- remainder --.

<u>Column 6,</u>
Line 35, after the phrase "symbol(s) and a", delete "reminder" and insert therefor -- remainder --.

Signed and Sealed this

Fifteenth Day of February, 2005

JON W. DUDAS
*Director of the United States Patent and Trademark Office*